July 24, 1962     J. FRAUENBERGER     3,045,986
AERATION ROTOR

Filed Aug. 17, 1959     2 Sheets-Sheet 1

INVENTOR.
JOHANNES FRAUENBERGER
BY Hammond & Littell
ATTORNEYS

July 24, 1962 J. FRAUENBERGER 3,045,986
AERATION ROTOR
Filed Aug. 17, 1959 2 Sheets-Sheet 2
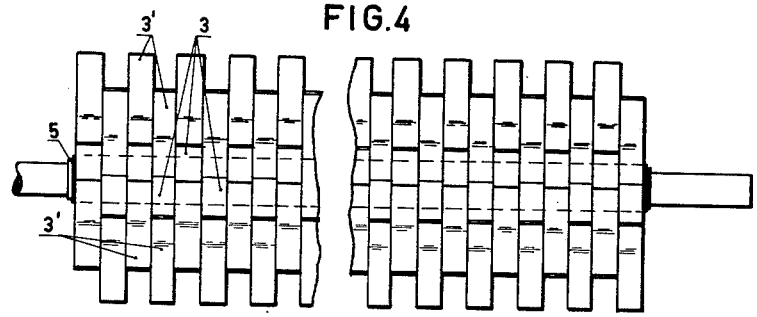
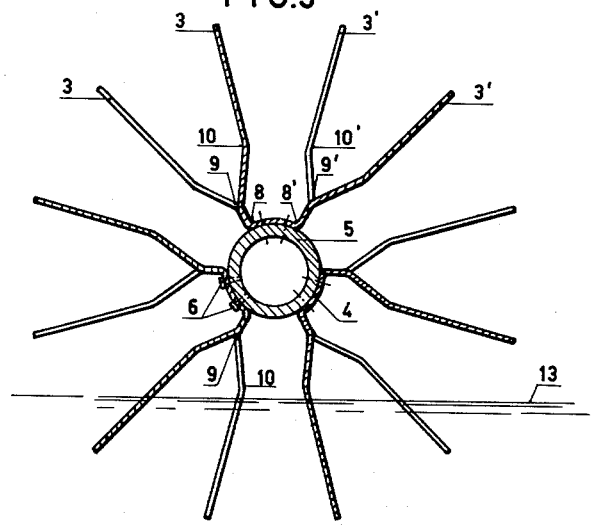
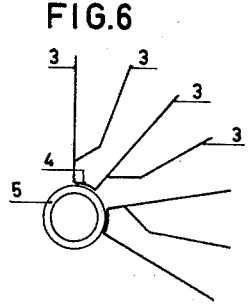
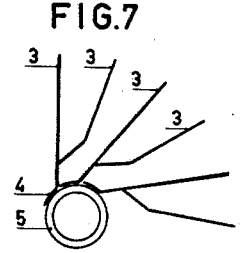
INVENTOR.
JOHANNES FRAUENBERGER
BY Hammond & Littell
ATTORNEYS United States Patent Office 3,045,986
Patented July 24, 1962

3,045,896
AERATION ROTOR
Johannes Frauenberger, Michelbach, Nassau, Germany, assignor to Nederlandse Organisatie voor Toegepast-Natuurweten-Schappelijk Onderzoek ten behoeve van de Volksgezonheid, The Hague, Netherlands, a corporation of the Netherlands
Filed Aug. 17, 1959, Ser. No. 834,210
Claims priority, application Germany Aug. 16, 1958
9 Claims. (Cl. 259—136)

The invention relates to an aeration rotor of the brush type for the aeration of water, sewage or waste liquid or for the introduction of gases into liquids, comprising a shaft having a number of toothed combs connected thereto, which shaft is rotated so as to make the teeth beat into the liquid.

Because aeration rotors often come into contact with corrosive liquids and are also subjected to particularly heavy load, only a very simple construction can give lasting satisfaction.

The load of the teeth is namely formed by the centrifugal force, by the stroke with which a tooth hits the surface of the liquid whereby the teeth are set vibrating, and by the resistance offered by the liquid, whereby in addition to this the emerging of the tooth from the liquid plays a part in the development of the vibrations.

The parts of the aeration rotor are therefore under unfavourable conditions exposed to very heavy fatiguing stresses.

An object of the invention is an aeration rotor having its combs connected to the shaft in a simple manner, whilst the connection thus effected is all the same strong and of a lasting reliability.

Another object of the invention is an aeration rotor, which can be constructed in a simple manner, because it is built up from simple parts.

The aeration rotor according to the invention excellently meets all the said requirements.

According to the invention said rotor comprises a shaft, to which a number of basic parts have been connected with the aid of radially positioned bolts, said basic parts being main girders of at least two combs having alternately positioned teeth, said combs together with a basic part being obtained from one single plate by double-bending at least part of the teeth.

According to the invention at least four rows of alternately positioned teeth are preferably made out of one single plate, whereby the basic part is formed by the middle part of the plate and is adapted to be the main girder of said four rows of teeth. The sides of the plate have been provided with incisions, and at least part of the strips thus formed have been double-bent so as to have said part of the strips form teeth which stand out from the original plane of the plate.

According to the invention all the teeth can be made to stand out from the plane of the plate by double-bending, whereby these double bends are such, that the teeth are bent symmetrically with respect to said plane.

Of course it is possible according to the invention to make the incisions in such a way as to form teeth which vary in width from their bases to their tops, which may increase aeration results.

The invention is hereinafter described with the aid of a drawing showing a number of embodiments of an aeration rotor according to the invention and of plates out of which the combs can be made.

FIG. 4 shows a view of an aeration rotor provided with plates according to FIG. 1;

FIG. 5 shows the cross-section of the rotor according to FIG. 4; and

FIGS. 6 and 7 schematically show cross-sections of some embodiments showing various positions of the teeth relative to the plate and the shaft.

Figure 1:
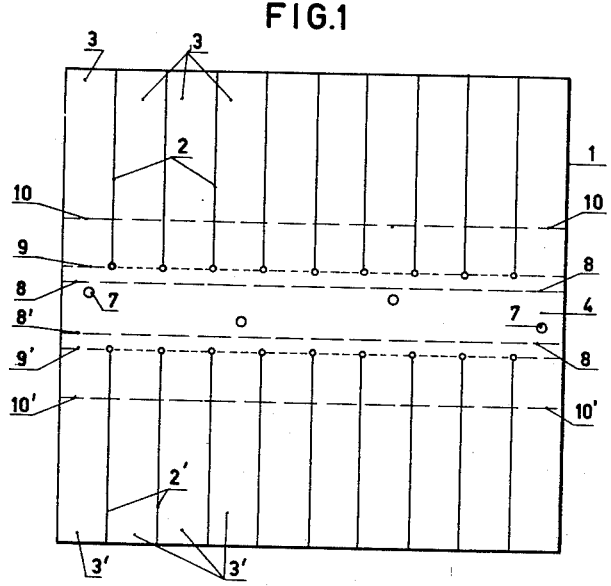
FIG. 1 shows a plate which, has been provided with straight incisions on two sides and from which by bending four rows of teeth are formed.

FIG. 1 shows a rectangular steel plate 1, which is at its sides provided with incisions 2 and 2', so as to form strips 3 and 3'. The middle part of the plate 1 forms a base 4 which is fastened onto a shaft 5 with the aid of radially positioned screw bolts 6, which fit into holes 7 of said base 4.

After the incisions and the holes have been made the plate is bent. The base 4 is bent along the lines 8 and 8', so as to form a U-girder having its legs positioned radially relative to the centre line of the shaft 5. This girder provides a rigid main girder for four rows of teeth. These teeth are obtained from the strips 3 and 3' by effecting the following bendings. Each strip 3 or 3' is bent along the line 9 or 9' so as to stand out from the original plane of the plate 1, and that alternately from both sides of said plane. Subsequently all the strips are bent in opposite direction along the line 10 or 10'. By effecting these bendings four rows of teeth are formed from one single plate whereby all the teeth are positioned in successive alternating rows radially to the shaft 5. The holes 7 are positioned so as to lie behind teeth which have been bent towards the other side of the plate 1, so that the bolt 6 is easily reached radially. On the shaft 5 are mounted three sets consisting of four combs each, each set being made out of one single plate.

Figure 2:
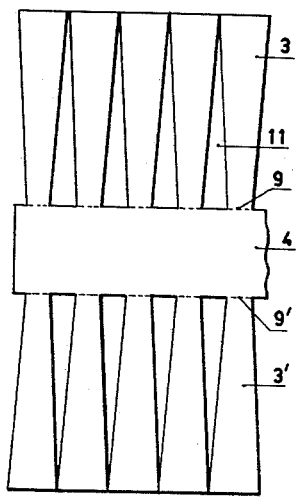
FIGS. 2 and 3 show analogous plates in which triangular or rectangular incisions have been provided for the forming of the teeth.
Figure 3:
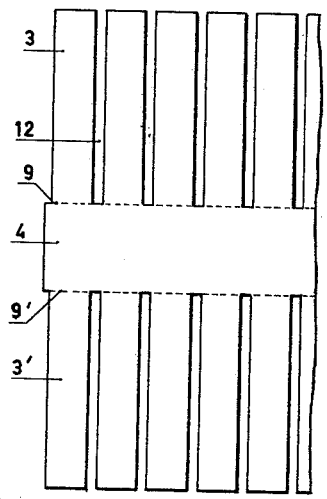

It is evident that, as indicated in FIGS. 2 and 3, the incisions 2 between the strips can also be widened into triangular pieces 11 or rectangles 12 which are entirely stamped out or cut out.

Further it is possible to have only half the number of strips bent, as shown in FIG. 6, according to which the strips are double-bent alternately. Naturally, in order to secure an equal outer radius for all the teeth, the strips lying in the flat plane of the plate should be correspondingly shortened.

FIG. 7 shows a rotor in which two rows of teeth have been made out of one plate. As a matter of course the base 4 then constitutes a side-part of the plate and not a middle part as in FIG. 1.

In addition to this the teeth according to FIG. 7 are not positioned radially, but enclose a small angle with the radial, which can under certain conditions be of advantage.

The teeth preferably beat into the liquid with their straight tips only, to which purpose the shaft 5 is arranged over the liquid level 13 at a distance exceeding the distance to the third bending line 10.

I claim:

1. Aeration rotor for the aeration of water, sewage or waste liquid or for the introduction of gases into liquids, comprising a shaft having a number of toothed combs connected thereto, which shaft is adapted to rotate so as to make the teeth beat into the liquid, characterized in that it comprises a shaft adapted to rotate, a plurality of beater elements substantially uniformly spaced around said shaft for substantially the entire length of said shaft, each beater element having a base secured to said shaft, each base having an integral substantially radial section extending outward from said shaft, each radial section being divided into strips and each strip being bent at a spaced distance from said shaft to one side of the plane of said radial sections, to provide the teeth for said combs, and the teeth being further bent at a greater distance from said shaft to provide four rows of beater elements on each base, which beater elements from the second bend outwardly, extend substantially radially of the center line of said shaft and are alternately spaced one on one side and one on the other side of the plane of said radial sections, and means to secure said bases to said shaft.

2. Aeration rotor according to claim 1, characterized in that at least four rows of alternately positioned teeth are made out of one single plate, whereby the base is formed by the middle part of the plate, and is adapted to be the main girder of said four rows of teeth.

3. Aeration rotor according to claim 1, characterized in that the teeth are bent symmetrically relative to the plane of the plate.

4. Aeration rotor according to claim 1, characterized in that only part of the teeth are double-bent and when in the flat plane of the plate, is of a length different from that of the other teeth.

5. An aeration rotor for the introduction of gases into liquids, comprising a shaft adapted to rotate and having teeth thereon to beat into a liquid for substantially the entire length of said shaft, four rows of said teeth being formed integral with a base portion secured to said shaft, each row of teeth extending from said shaft in a plane substantially radial to the center line of said shaft and each tooth having two bends therein at unequal distances from said shaft, the planes of the teeth between the first and the second bend forming an angle with reference to a plane radial to the center line of said shaft.

6. An aeration rotor for the introduction of gases into liquids, comprising a shaft adapted to rotate and having teeth thereon to beat into a liquid for substantially the entire length of said shaft, said teeth being uniformly spaced around said shaft and at their outer ends extending in planes substantially radial to the center line of said shaft, each four rows of said teeth being formed integral with a base member secured to said shaft by double bending of the teeth from the base member, the said teeth extending radially of the center line of said shaft from said base member to the first bend, then extending at an angle to a plane radial to the center line of said shaft and then radially of the center line of said shaft from the second bend to the outer ends of said teeth.

7. An aeration rotor comprising a center shaft adapted to rotate and having rows of sheet metal teeth secured thereto for substantially the entire length of said shaft, the rows of said teeth being formed integral with base members secured to said shaft, some of said rows having two bends therein whereby said rows of integral teeth first extend substantially radially of the center line of said shaft from their outer ends inwardly, then extend at an angle to a plane radial to said shaft and at their inner ends extend substantially in a radial plane of said shaft.

8. An aeration rotor comprising a center shaft adapted to rotate and having rows of sheet metal teeth secured thereto for substantially the entire length of said shaft, the rows of said teeth being formed integral with base members secured to said shaft, said teeth having two bends therein, the outer ends of the teeth lying in planes substantially radial with the center line of said shaft, the intermediate section of the teeth between the two bends lying in planes which form an angle to planes radial to the center line of said shaft and the inner ends of said teeth lying in planes substantially radial to the center line of said shaft.

9. An aeration rotor comprising a center shaft adapted to rotate and having rows of sheet metal teeth secured thereto for substantially the entire length of said shaft, the rows of said teeth being formed integral with base members secured to said shaft, one row of said teeth having two bends therein, the outer ends of the teeth in said row lying in planes substantially radial to the center line of said shaft, the intermediate section of said teeth between the two bends lying in planes which form an angle to planes radial to the center line of said shaft and the intermediate section being integrally connected at its inner end with said base member at an angle greater than 90°.

References Cited in the file of this patent

UNITED STATES PATENTS

| | | |
|---|---|---|
| 754,195 | Bullard | Mar. 8, 1904 |
| 1,241,390 | Jackson | Sept. 25, 1917 |
| 1,920,905 | Harper | Aug. 1, 1933 |
| 2,346,742 | Gaddie | Apr. 18, 1944 |
| 2,355,621 | Brown | Aug. 15, 1944 |
| 2,378,646 | Manning | June 19, 1945 |
| 2,558,268 | Reich | June 26, 1951 |
| 2,639,898 | Reich | May 26, 1953 |
| 2,840,356 | Wills | June 24, 1958 |

FOREIGN PATENTS

| | | |
|---|---|---|
| 918,310 | France | Oct. 14, 1946 |
| 319,683 | Great Britain | June 19, 1930 |

OTHER REFERENCES

German App. 1,029,755, May 8, 1958.